United States Patent [19]

Nagasaki et al.

[11] Patent Number: 5,376,965
[45] Date of Patent: Dec. 27, 1994

[54] ELECTRONIC IMAGING SYSTEM CAPABLE OF RECORDING/REPRODUCING IMAGES WITH ANY ONE OF SEVERAL POSSIBLE RECORDING MEDIA

[75] Inventors: Tatsuo Nagasaki, Yokohama; Hidetoshi Yamada, Tokyo; Yutaka Yunoki, Kunitachi, all of Japan

[73] Assignee: Olympus Optical Co., Ltd., Tokyo, Japan

[21] Appl. No.: 67,215

[22] Filed: May 25, 1993

Related U.S. Application Data

[63] Continuation-in-part of Ser. No. 581,470, Sep. 11, 1990, abandoned.

[30] Foreign Application Priority Data

Sep. 14, 1989 [JP] Japan ................................. 1-239206

[51] Int. Cl.$^5$ ............................................. H04N 5/225
[52] U.S. Cl. ..................................... 348/232; 348/233
[58] Field of Search ................ 358/209, 906; 348/232, 348/233; H04N 5/225

[56] References Cited

U.S. PATENT DOCUMENTS

| | | |
|---|---|---|
| 3,833,758 | 9/1974 | Ferrari ........................ 358/906 X |
| 4,057,830 | 11/1977 | Adcock . |
| 4,163,256 | 7/1979 | Adcock . |
| 4,378,572 | 3/1983 | Hoffmann . |
| 4,468,708 | 8/1984 | Coleman, Jr. . |
| 4,480,271 | 10/1984 | Coleman, Jr. . |
| 4,489,351 | 12/1984 | d'Alayer de Costemore d'Arc ............................. 358/209 X |
| 4,507,689 | 3/1985 | Kozuki et al. ................. 358/906 X |
| 4,541,010 | 9/1985 | Alston . |
| 4,691,253 | 9/1987 | Silver . |
| 4,829,249 | 5/1989 | Matsushita et al. . |
| 4,887,161 | 12/1989 | Watanabe et al. ............. 358/906 X |
| 4,897,732 | 1/1990 | Kinoshita et al. . |
| 4,899,231 | 2/1990 | Maeda et al. ..................... 358/209 |
| 4,901,160 | 2/1990 | Kinoshita et al. ............. 358/906 X |
| 4,937,676 | 6/1990 | Finelli et al. .................. 358/906 X |
| 4,947,271 | 8/1990 | Nakayama et al. . |
| 4,958,337 | 9/1990 | Yamanaka et al. . |
| 5,067,029 | 11/1991 | Takahashi . |
| 5,274,457 | 12/1993 | Kobayashi et al. ................ 358/209 |

FOREIGN PATENT DOCUMENTS

| | | |
|---|---|---|
| 0299228 | 6/1988 | European Pat. Off. . |
| 0336317 | 3/1989 | European Pat. Off. . |
| 3240210 | 10/1982 | Germany . |
| 3704898 | 2/1987 | Germany . |
| 3705185 | 2/1987 | Germany . |
| 56-43884 | 4/1981 | Japan . |

OTHER PUBLICATIONS

Still Video, Fotos Auf Floppies, Funkschauf 25, 1988, pp. 40–42.
Kennsatze und Dateianordnung auf Disketten fur den Datenaustausch, Oct. 1984, pp. 136–157.

Primary Examiner—James J. Groody
Assistant Examiner—Cheryl Cohen
Attorney, Agent, or Firm—Frishauf, Holtz, Goodman & Woodward

[57] ABSTRACT

An image pickup device electronically senses an object to be photographed and generates an electronic still image signal. An A/D converter converts the electronic still image signal generated by the image pickup device into a digital signal. An error correction coding section performs error correction coding for the digital signal obtained by the A/D converter. A recording modulation section performs recording modulation of an output from the error correction coding section so as to perform predetermined magnetic recording. A recording section records an output from the recording modulation section on a predetermined magnetic recording medium. Different recording media can be used, such as magnetic and semiconductor, provided on respective imaging sub-systems. A semiconductor imaging sub-system is provided with an I/O controller for establishing compatibility with signals of the magnetic imaging sub-system.

5 Claims, 6 Drawing Sheets

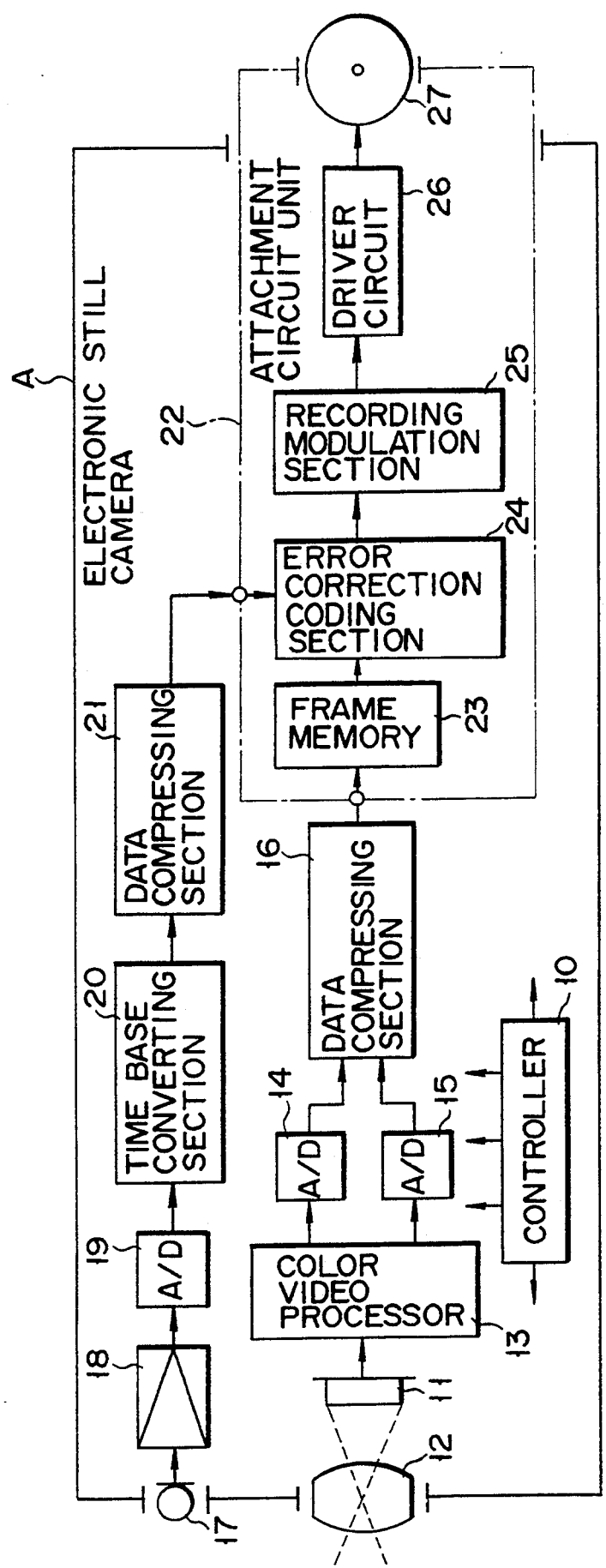
F I G. 1

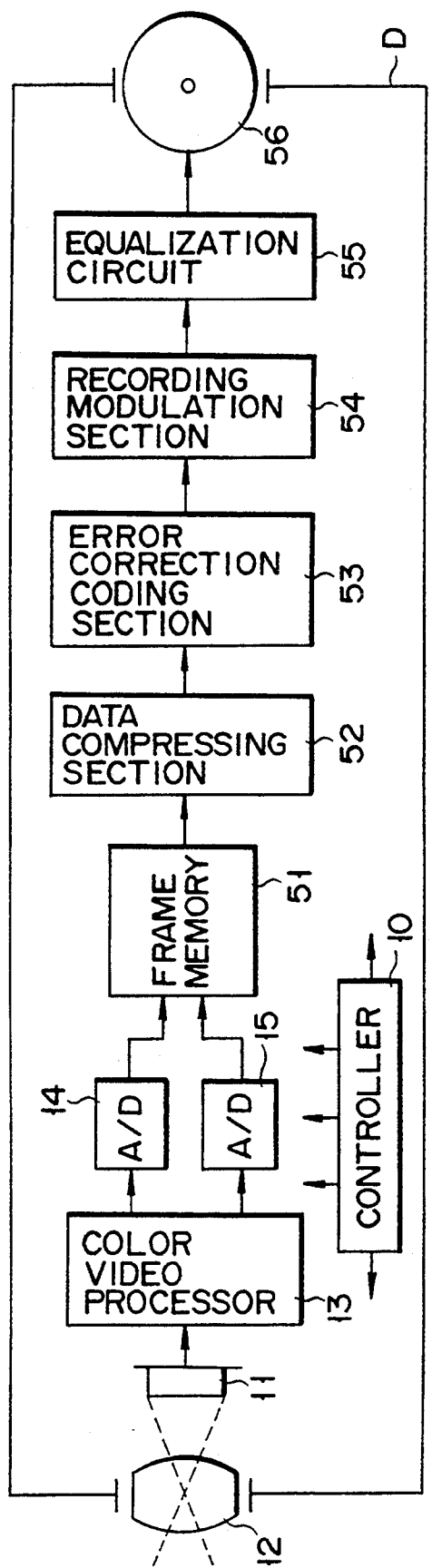
F I G. 5
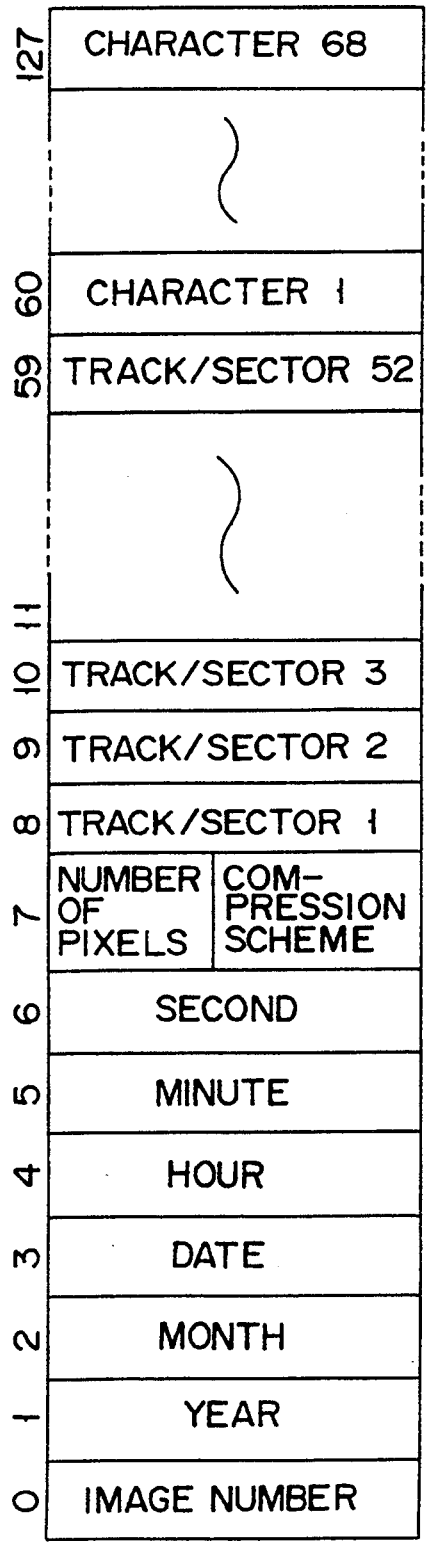
F I G. 6

ELECTRONIC IMAGING SYSTEM CAPABLE OF RECORDING/REPRODUCING IMAGES WITH ANY ONE OF SEVERAL POSSIBLE RECORDING MEDIA

CROSS REFERENCE TO RELATED APPLICATIONS

This is a continuation-in-part of U.S. application Ser. No. 07/581,470, filed on Sep. 11, 1990, which is now abandoned.

FIELD OF THE INVENTION

The present invention generally relates to an electronic imaging system such as an electronic still camera system and, more particularly, to an electronic still camera system for converting an electronically sensed/input electronic still image into a digital image signal and recording the image signal by using an inexpensive magnetic recording medium such as a magnetic disk.

DESCRIPTION OF THE RELATED ART

With a decrease in size and an increase in performance of solid-state image sensing devices, various types of electronic cameras using these solid-state image sensing devices have been developed. A home video camera is one of them. Recently, various electronic still cameras for electronically sensing and recording an object image instead of recording an object image by using a silver chloride film have been developed.

An electronic still camera of this type is basically designed to electronically sense/input an object image formed on the image sensing surface of a solid state image pickup device such as a CCD (charge coupled device) through an optical lens and to record it in a magnetic floppy disk or a magnetic tape upon predetermined image signal processing, as disclosed in, e.g., Published Unexamined Japanese Patent Application No. 56-43884. In an electronic still camera designed to convert an object image into a digital signal, a sensed/input electronic still image is converted into a digital signal, and the digital signal is recorded in a so-called semiconductor memory card or the like.

The electronic still image sensed/recorded in this manner is read out from the recording medium by using a reproduction apparatus and is converted into a television signal of, e.g., the NTSC (National Television Standard Committee) scheme so as to be reproduced as an image on a TV receiver (monitor).

In the above-described recording of an electronic still image using a magnetic floppy disk or a magnetic tape, a recording format and the like are standardized according to the EIAJ (Electronic Industries Association of Japan) standards or the like. In electronic still cameras of this type, therefore, various attempts have been made to record/reproduce an image signal with high quality while satisfying the standards of this type.

In contrast to this, in electronic still cameras designed to convert an electronic still image into a digital signal and record the digital signal on a semiconductor memory card, no significant movement toward standardization is present. In such a type of camera, various studies have been made on efficient recording/reproduction of an image signal with high quality. However, the serious problem of electronic still cameras of this digital recording scheme is that semiconductor memory cards used for digital recording of image signals are very expensive.

If digital recording of image signals is performed by using the above-mentioned magnetic disk or magnetic tape in place of such an expensive memory card, the cost of recording can be reduced to, for example, 1/50 that of recording using the memory card, thus allowing users to very easily use the camera.

SUMMARY OF THE INVENTION

It is, therefore, an object of the present invention to provide a new and improved electronic imaging system such as electronic still camera system with high quality image recording/reproduction functions in which digital recording of electronic still images can be effectively performed by using an inexpensive, easy-to-use magnetic floppy disk, magnetic tape or hard disk of small size as a recording medium, and high-quality image reproduction can be performed, thereby greatly increasing the practical value of the system.

According to one aspect of the present invention, an electronic imaging system is provided for recording or reproducing a picture utilizing an applied recording device or media comprising. An imaging main system includes a data processing means and one-side connector means, with the data processing means generating a data signal to be recorded in the recording device or media inclusive of a digital image data signal corresponding to a previously picked-up image, or generating a signal of a form adapted to display an image on a display means based on a reproduced signal from the recording device or media. The one-side connector means connects any one of several predetermined imaging sub-systems applicable to the electronic imaging system with the imaging main system. A plurality of first imaging sub-systems has each one being formed as a unit and having a driver circuit means and an other-side connector means. The driver circuit means drives a magnetic recording device or media so as to record or reproduce the data signal supplied thereto or sent therefrom, while such first imaging sub-system is connected to the imaging main system by means of a connection between the one-side connector means of the imaging main system and the other-side connector means of such imaging sub-system. A plurality of second imaging sub-systems has each one being formed as a unit and having an I/O controller means and an other-side connector means, the I/O controller means controlling record and/or reproduction operations for an applied semiconductor memory as to the data signal supplied thereto or sent therefrom, while such second imaging sub-system is connected to the imaging main system by means of a connection between the one-side connector means of the imaging main system and the other-side connector means of such second imaging sub-system. The I/O controller means controls transmission of the data signal conveyed through the other-side connector means of such second imaging sub-system to be compatible with the data signal conveyed through the other-side connector means of such first imaging sub-system.

The electronic imaging system embodied as an electronic still camera system according to the present invention takes an effect that after an electronically sensed electronic still image signal is digitized and is processed by predetermined error correction coding, the obtained signal is subjected to predetermined recording modulation and is recorded on a predetermined magnetic recording medium.

Especially an electronic still camera, as the imaging main system, for electronically sensing an object image is characterized in that the camera includes a video processor for performing predetermined video signal processing for an electronic still image signal electronically sensed by an image sensing device, an A/D converter for performing digital conversion of the electronic still image signal processed by the video processor according to the predetermined video signal processing, and a data compressor for data-compressing the digital electronic still image signal, and a mechanism for performing predetermined error correction coding and recording modulation for the data-compressed electronic still image signal and recording the obtained signal on a magnetic recording medium which is disposed in a detachably mounted attachment circuit unit as the first imaging sub-system.

In the electronic imaging system embodied as a reproduction system, an attachment circuit unit, as the first imaging sub-system, having a mechanism for reading out and demodulating a signal recorded in a magnetic recording medium and subsequently performing error correction processing for the signal is detachably mounted to a reproduction apparatus, as the imaging main system, and the apparatus includes a means for performing data decoding of a reproduction signal output from the attachment circuit unit, a D/A converter for performing predetermined image signal processing for the data-decoded signal and subsequently restoring the signal to an analog signal of the original form, and means for converting the analog signal into a signal having a predetermined monitoring signal form.

In addition, the electronic still camera is characterized in that the electronic still image signal is recorded by arbitrarily using recording tracks and sectors set on a magnetic recording medium in accordance with, e.g., the form of error correction coding for the electronic still image signal, and corresponding recording management information is recorded on a predetermined specific track of the magnetic recording medium.

Furthermore, the electronic still camera is characterized in that the camera includes a function for testing the characteristics of the recording tracks and sectors set on the predetermined magnetic recording medium and allowing only recording tracks and sectors of the magnetic recording medium which pass the test to be used for recording of the electronic still image signal. Moreover, the electronic still camera is characterized in that the camera includes a means for reproducing the electronic still image signal from the predetermined magnetic recording medium immediately after the electronic still image signal is recorded on the magnetic recording magnetic medium and testing quality of the electronic still image signal recorded on the magnetic recording medium, thereby realizing highly reliable recording of the electronic still image signal on the magnetic recording medium.

According to the present invention, when digital recording of an electronically sensed electronic still image signal is to be performed, error correction coding is performed for the digital image signal. For this reason, even if a burst-like error such as dropout is caused in the digital image signal recorded on a magnetic floppy disk or a magnetic tape, the error can be effectively compensated to ensure sufficiently high signal quality.

In addition, since the digital signal processed by error correction coding is subjected to recording modulation and is recorded on a magnetic recording medium, DC components contained in the recorded data can be effectively suppressed, and problems associated with, e.g., the DC blocking characteristics of the magnetic head or the like can be effectively prevented. This allows high-quality recording/reproduction of the image signal.

In addition, an error correction coding circuit, a recording modulation section, and the like are formed into an attachment circuit unit, and the unit is used after it is mounted in the electronic still camera as needed. With this system arrangement, the electronic still camera can be applied to various different purposes by interchanging attachment circuit units, thus improving the applicability. More specifically, a semiconductor memory card is prepared as the second imaging sub-system of the present invention, recording/reproduction of an image signal can be performed in accordance with various types of recording media by simply selecting the corresponding circuit unit.

Furthermore, since recording of electronic still images is performed by arbitrarily using empty areas of the recording tracks and sectors of a magnetic recording medium in accordance with, e.g., the form of error correction coding for electronic still image signals, more specifically a data amount or the like, a large number of electronic still image signals can be recorded by effectively using the limited storage capacity of the magnetic recording medium.

Moreover, only recording tracks and sectors which pass quality tests in advance are used for recording of the electronic still images, and an electronic still image signal recorded on the magnetic recording medium is immediately read out to test its recording quality. Therefore, the recording quality can be made sufficiently high in spite of the fact that the inexpensive magnetic recording medium is used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention, in which:

FIGS. 1 and 2 show an electronic imaging system according to an embodiment of the present invention, in which FIG. 1 is a block diagram showing a schematic arrangement of an electronic still camera system as the electronic imaging system, and FIG. 2 is a block diagram showing a schematic arrangement of a reproduction system as the electronic imaging system;

FIG. 5 is a block diagram showing a schematic arrangement of an electronic still camera having a frame memory and a data-compressing means built in one body;

FIG. 6 is a view showing a recording format of recording management information applied to the camera in FIG. 5;

DETAILED DESCRIPTION OF THE PREFERRED EMBODIMENTS

Figure 2:
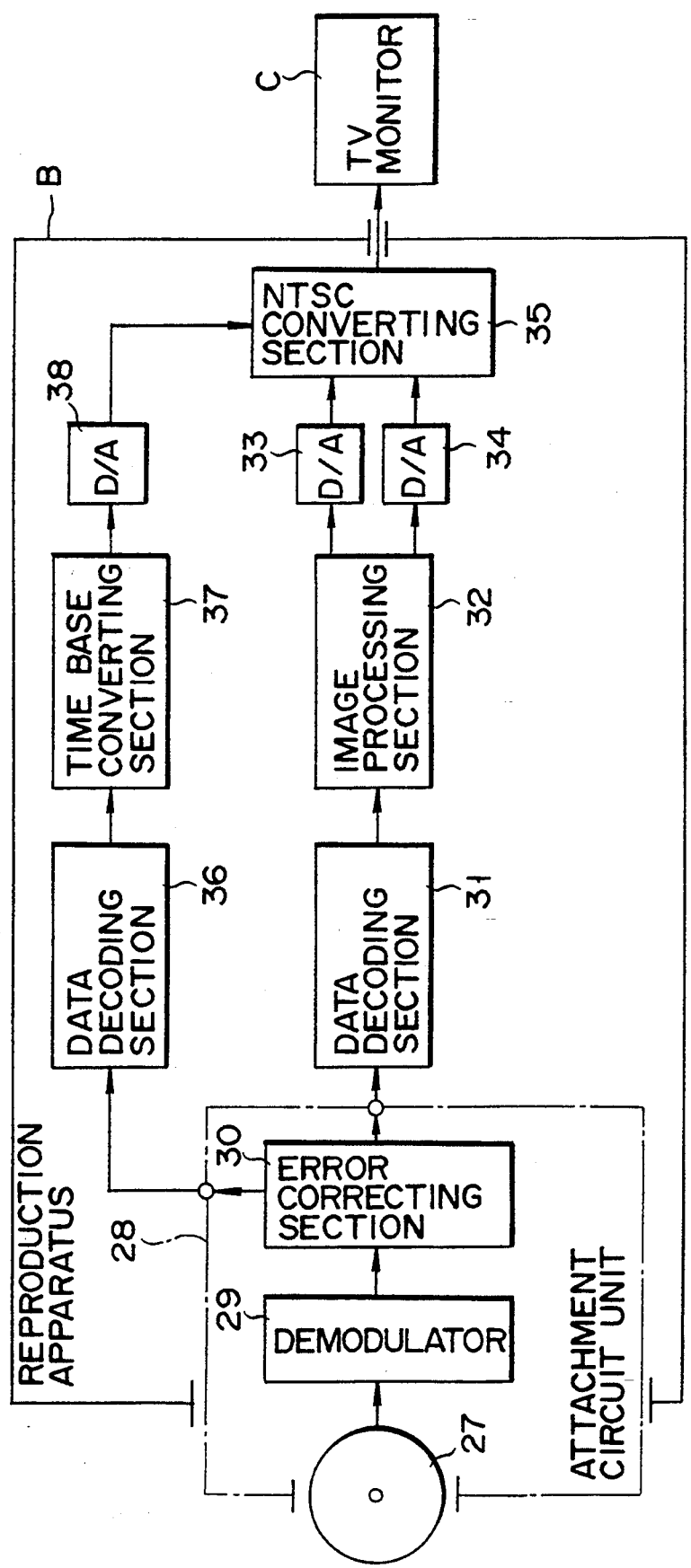

Reference will now be made in detail to the presently preferred embodiments of the invention as illustrated in the accompanying drawings, in which like reference characters designate like or corresponding parts throughout the several drawings.

Electronic still camera systems according to several embodiments of the present invention will be described below with reference to the accompanying drawings.

FIG. 1 is a block diagram showing a schematic arrangement of an electronic still camera system associated with an electronic imaging system according to an embodiment of the present invention. FIG. 2 is a block diagram showing a schematic arrangement of a reproduction system as the electronic imaging system associated with the system in FIG. 1.

Referring to FIG. 1, an electronic still camera A includes an image sensing system constituted by a controller 10 for controlling the overall operations of the camera A, a solid-state image pickup device 11, constituted by a CCD (charge coupled device) or the like, for electronically sensing/inputting an object image, and an optical lens 12 for forming an object image on the image sensing surface of the solid-state image pickup device 11. The electronic still camera A is designed to input electronic still image signals electronically sensed by the solid-state image pickup device 11 to a color video processor 13 so as to perform predetermined video signal processing. Video signal processing to be performed by the video processor 13 includes y correction processing for the image system, color separation processing for separating each image signal into a luminance signal component and a color difference signal component, and the like.

The luminance signal component and the line sequential color difference signal output upon color separation processing by the color video processor 13 are respectively converted into digital signals by A/D converters 14 and 15 and are supplied to a data compressing section 16. In an electronic still camera using a semiconductor memory card (not shown) as an image signal recording medium, digital image signals subjected to predetermined data compression processing in the data compressing section 16 are sequentially and electronically recorded on the semiconductor memory card upon addition of control information for the electronic still images.

Note that in this electronic still camera A, audio information associated with the electronic still images sensed/input in the above-described manner is also acquired and recorded together with the electronic still images.

More specifically, a microphone 17 acquires/inputs audio information (including ambient sound information) associated with an object (to be sensed) upon image sensing of an object image. The input audio information is amplified to a predetermined input level by a preamplifier 18. The audio information input/processed in this manner is converted into a digital signal by an A/D converter 19 and is subjected to time axis compression by re-sampling or the like in a time base converting section 20. The time-axis-compressed audio information is then subjected to predetermined data compression processing in a data compressing section 21. When the electronic still image signal is to be recorded on the semiconductor memory card, as the second imaging sub-system in the above-described manner, the signal is recorded in association with a corresponding recorded image signal.

The electronic still camera A according to this embodiment is characterized in that, in place of the semiconductor memory card, an attachment circuit unit 22, as the first imaging sub-system, including a magnetic recording medium 27 such as a hard disk of small size, a magnetic floppy disk or a magnetic tape as a signal recording medium is attached in place of the semiconductor memory card.

More specifically, the attachment circuit unit 22 basically comprises a frame memory 23 for receiving and buffering a one-frame image signal data-compressed by the data compressing section 16, and an error correction coding section 24 for reading out the data-compressed digital image signal from the frame memory 23 in synchronism with a signal recording operation with respect to the magnetic recording medium 27, and reading out digital audio information data-compressed by the data compressing section 21, thereby performing predetermined error correction coding processing of the read signal and information.

Error correction coding processing by the error correction coding section 24 is performed by using Reed-Solomon product codes or the like which exhibit high error correction performance with respect to, e.g., burst-like code errors, allow arbitrary selection of code lengths, and allow hardware to be easily formed into an LSI. More specifically, a one-frame image is divided into a large number of blocks, and Reed-Solomon product coding is performed by doubly adding redundant bits for error correction in horizontal and vertical directions.

In the attachment circuit unit 22, the digital signal (image signal and audio information), which underwent error correction coding in this manner, is further subjected to predetermined recording modulation (recording coding) in a recording modulation section 25. This recording modulation processing is performed by suppressing DC components contained in the above-mentioned digital signal as an object to be recorded, because a magnetic head and the like for recording signals in the magnetic recording medium 27 have DC blocking characteristics, and performing coding processing (modulation processing) for averaging inversion intervals of bits. In this recording modulation processing, for example, as a coding scheme, various techniques are used: scrambled NRZ (non return to zero) coding, 8–10 block coding, and Miller square coding.

The signal subjected to recording modulation by such coding is magnetically recorded on the magnetic recording medium 27 through a driver circuit 26.

The above-described error correction coding and recording modulation processing required to digitize an electronic still image are performed by the circuit portion integrated as the attachment circuit unit 22 independently of the main body portion of the electronic still camera A. In addition, error correction coding processing and recording modulation processing for burst-like signal errors due to dropout and for the DC blocking characteristics, which tend to pose problems when digital signals are recorded on the magnetic recording medium 27 such as a hard disk of small size, a magnetic floppy disk or a magnetic tape, are executed in the attachment circuit unit 22. As a result, inconveniences posed in magnetic recording can be effectively eliminated, and magnetic recording of digital image signals can be effectively performed by using the magnetic recording medium 27 such as a hard disk of small size, a magnetic floppy disk or a magnetic tape which are inexpensive and easy to handle.

Note that the above-mentioned magnetic recording medium 27 is detachably mounted on the attachment circuit unit 22 and is replaced with another medium as needed to be used for digital recording of image signals and audio information.

The digital image signal magnetically recorded on the magnetic recording medium 27 in the above-described manner is read and reproduced by a reproduction apparatus B (FIG. 2) and is provided for image reproduction by means of a TV monitor C in the following manner.

Referring to FIG. 2, the reproduction apparatus B, as the electronic imaging system, is basically designed to read out the electronic still image signal and the audio information recorded as digital data in the semiconductor memory card, as the second imaging sub-system, and to perform processing for image and sound reproduction. At the same time, the reproduction apparatus B is designed to mount a circuit portion as an attachment circuit unit 28, as the first imaging sub-system, in place of the semiconductor memory card and to read out the digital image signal and the audio information magnetically recorded on the magnetic recording medium 27 so as to perform signal processing for image and sound reproduction.

More specifically, the attachment circuit unit 28 to be mounted on the reproduction apparatus B comprises a demodulator 29 for reading out image signals from a magnetic recording medium set in the unit 28 and performing demodulation processing of the readout image signals, and an error correcting section 30 for detecting data errors from the signals read out from the magnetic recording medium 27 by using the error correction codes added by the error correction coding processing as described above, and performing error correction of the detected errors. The demodulator 29 is arranged in correspondence with the recording modulation section 25 (FIG. 1) and has a function of restoring the modulated signal, which is recording-modulated by suppressing its DC components so as to compensate for the DC blocking characteristics of the magnetic head, to the original signal form. Error correction processing is performed for signals demodulated by the demodulator 29 so that even if burst-like signal omissions (signal errors) such as dropouts occur when signal recording/reproduction is performed with respect to the magnetic recording medium 27, these omissions can be effectively corrected.

The signals obtained by compensating for the problems associated with digital signal recording on the magnetic recording medium 27 by using the attachment circuit unit 28 are input to the main body portion, as the imaging main system, of the reproduction apparatus B.

In the main body portion of the reproduction apparatus B, the image signal components are data-compressed by the above-described data compression pressing and are decoded by a data decoding section 31. The image signal decoded by the data decoding section 31 is stored in a one-frame memory incorporated in an image processing section 32. The image processing section 32 performs predetermined signal processing with respect to the one-frame image signal stored therein. For example, the image processing section 32 separates the image signal into, e.g., luminance signal components and color difference signal components and sequentially outputs them. The luminance signal components and the color difference signal components output from the image processing section 32 are restored to the original analog signal form through D/A converters 33 and 34. The restored analog signal is then supplied to, e.g., an NTSC converting section 35 to be converted into an NTSC television signal and is output to a TV monitor C so as to be reproduced as an image.

Meanwhile, in the reproduction apparatus B, decoding processing of the audio information supplied from the attachment circuit unit 28 is performed by a data decoding section 36 in the same manner as described above. The decoded audio information signal is converted into the original time axis signal by a time base converting section 37 and is restored to the analog signal through a D/A converter 38. The analog signal is then supplied to the NTSC converting section 35. Upon reproduction processing of this audio information, the audio information associated with the electronic still image is added to the above-mentioned NTSC television signal, and audio output is performed together with image reproduction.

In this embodiment, image signals from the magnetic recording medium 27 are reproduced by using the attachment circuit unit 28. However, when a semiconductor memory card is to be mounted in place of the attachment circuit unit 28, image signals are read out from the semiconductor memory card. With respect to the image signals read out from the semiconductor memory card, the main body portion of the reproduction apparatus B functions in the same manner as in the above-described signal reproduction processing.

According to the reproduction apparatus B having such an arrangement, digital image signals sensed by the electronic still camera A shown in FIG. 1 and recorded on the magnetic recording medium 27 by using the attachment circuit unit 28 can be reproduced and output as images by effectively processing burst-like errors and the like. Therefore, various practical effects can be obtained. For example, an object (to be photographed) can be electronically sensed/recorded and reproduced by an electronic still camera by effectively using a magnetic recording medium such as a magnetic floppy disk or a magnetic tape which is very inexpensive and easy for a user to handle as compared with a semiconductor memory card.

FIG. 5 shows a schematic arrangement of an electronic still camera D which has a frame memory and a data compressing means built in one body.

Similar to the electronic still camera A shown in FIG. 1, the electronic still camera D basically comprises the following components as an image sensing system: a controller 10 for controlling the overall operations of the camera A; a solid-state image pickup device 11 constituted by a CCD or the like for electronically sensing and inputting an object image; and an optical lens 12 for forming an object image on the image sensing surface of the solid-state image pickup device 11, and is designed to input electronic still image signals electronically sensed by the solid-state image pickup device 11 to a color video processor 13 and to perform predetermined video signal processing of these signals. Video signal processing to be performed by the video processor 13 includes correction processing for the image sensing system, color separation processing for separating each image signal into a luminance signal component and a color difference signal component, and the like.

The luminance signal component and the line sequential color difference output upon color separation processing by the color video processor 13 are respectively converted into digital signals by A/D converters 14 and 15. The digital signals are temporarily written in a frame memory 51. A data compressing section 52 reads out the luminance signal component and the color difference signal component of the above-mentioned image signal written in the frame memory 51 and performs data compression processing of these signal components. The data compressing section 52 performs data compression of the respective signal components in accordance with a sequence of processing, e.g., orthogonal transformation, linear quantization, and entropy coding. More specifically, the image signal is divided into blocks each consisting of, e.g., 8×8 pixels, and orthogonal transformation such as DCT (discrete cosine transformation) is performed first. After linear quantization processing is performed for the image signal which underwent this orthogonal transformation, entropy coding processing such as Huffman coding is performed for the image signal.

Such data compression/coding processing of an image signal is to be performed in units of blocks and is performed while the order of reading out the image signal from the frame memory 51 is properly changed. As will be described later, when an image signal is written in a magnetic recording medium, a wait time for, e.g., head access is sometimes produced. In such a case, reading of the image signal from the frame memory 51 is temporarily stopped, and the signal is held in the frame memory 51.

The image signal which is data-compressed by the data compressing section 52 in the above-described manner is input to an error correction coding section 53 in units of, e.g., frames. The error correction coding section 53 performs error correction coding for the data-compressed image signal by executing so-called cross interleave Read-Solomon coding using parities C1 (41,37,5) and C2 (36,32,5). A recording modulation section 54 performs recording modulation processing for the image signal which underwent error correction coding in this manner. The recording modulation processing section 54 has a DC component suppressing effect, e.g., 8-10 conversion coding, i.e., converting 8-bit input data into a predetermined 10-bit code. The image signal modulated by the recording modulation section 54 is subjected to amplitude equalization or phase equalization in an equalization circuit 55. The image signal is then magnetically recorded on a magnetic recording medium 56.

For example, a floppy disk standardized for a still video is used as the magnetic recording medium 56 used to record such an image signal. A floppy disk of this type is a disk-like magnetic recording medium having an outer diameter of 47 mm and a thickness of 40 μm. Such floppy disk is standardized to have a total of 52 60-μm wide recording tracks concentrically arranged at a pitch of 100 μm. In this floppy disk, the 1st to 50th recording tracks from the outer periphery are set as main tracks; the 51st track, a track as a guard band which is not used for signal recording; and the 52nd track as, the innermost track, a so-called cue track.

Each track is divided into an index region and four sectors along the track direction. Each sector is set to have a recording capacity of 4,096 bytes. In other words, each track is designed and standardized to record information of 16,384 bytes by using four sectors divided in the above-described manner.

Recording of image signals on the magnetic recording medium 56 standardized in this manner is performed by the electronic still camera D in the following manner.

When the floppy disk as the magnetic recording medium 56 is mounted on the electronic still camera D, the controller 10 reads out recording management information from the 52nd recording track of the floppy disk. The recording management information recorded on the 52nd recording track is constituted by additional information about image data of one or a plurality of frames recorded on the floppy disk, and information about recording tracks/sectors in which the image data is recorded. The recording management information is used as data for managing a format used to record image data and an area of the floppy disk used to record the data.

Note that the above-mentioned additional information is information representing the title of an image, photographed data, the number of pixels, a data compression scheme, permission/inhibition of erasure of the image, and the like. In addition to such additional information, track/sector numbers representing locations where the image is recorded are recorded as the above-mentioned recording management information in the 52nd recording track.

More specifically, this recording management information is provided as, e.g., information having a format shown in FIG. 6 which is constituted by 128 bytes per image. According to this format, "image number", recording date information, i.e., "year", "month", "date", "hour", "minute", and "second" and "number of pixels/data compression scheme" are recorded as the above-mentioned additional information from the start byte in units of 8 bits (one bytes). The above-mentioned track/sector numbers representing the locations where the image data is recorded are expressed by 8 bits (one byte) each and are recorded after the additional information, i.e., from the 8th byte to the 59th byte. Character information such as a title are recorded in the remaining 68 bytes from the 60th byte to the 127th byte.

Recording management information having such a format is recorded on the 52nd track for each image data of one frame so as to correspond to each of image data of a maximum of 128 frames.

In this embodiment, the recording management information is recorded in the 52nd track of the floppy disk standardized in the above-described manner. However, it is apparent that the recording management information can be recorded on a predetermined track other than the 52nd track.

Subsequently, the controller 10 checks the presence/absence of image data already recorded on the floppy disk in accordance with the above-mentioned recording management information read out from the floppy disk. If an empty space is present in the recording area, the controller 10 checks which recording tracks/sectors are empty. The controller 10 then records the image data by selectively using the empty recording tracks/sectors in accordance with an amount of data compressed by, e.g., the above-described data compression coding of image signals. At the same time, the controller 10 generates new recording management information, such as described above, associated with recording of the image data, and writes it in the 52nd recording track.

When an image signal is to be recorded on empty recording tracks/sectors, recording need not be selectively performed in the order of increasing track/sector numbers. For example, in accordance with the data amount of an image signal to be recorded, empty tracks/sectors can be arbitrarily selected to continuously record the data. Alternatively, empty tracks/sectors on the outer or inner periphery may be properly selected in accordance with the significance of an image. In addition, image data of one frame need not be recorded on continuous tracks/sectors. However, if image data of one frame is recorded over different tracks, a wait time associated with head access is inevitably produced in the process of recording the image data.

According to the camera system described above, the system designed to record image data by arbitrarily using recording tracks/sectors of a floppy disk in this manner, a large number of image data subjected to data compression coding can be recorded by effectively using the storage capacity of a floppy disk, in comparison with a conventional, general system designed to record image data of one frame in one recording track. Since image signals are subjected to data compression coding to compress/reduce its data amount, if such image signals are recorded in units of recording tracks, a considerable empty area is generated in each recording track. According to the camera system of this embodiment, since another image data is recorded by effectively using such an empty area, a large amount of image data can be recorded at a high density without limitation based on the number of recording tracks.

In addition, specific recording tracks/sectors in which given image data is recorded in this manner can be checked in accordance with the above-mentioned recording management information so that the image data can be selectively read out and reproduced as needed in accordance with this recording management information. Therefore, even if image signals subjected to data compression recording are recorded by arbitrarily using recording tracks/sectors, no associated problems are posed.

When a semiconductor memory card or the like is used as a recording medium for image signals, the recorded image signals can be semi-permanently stored. However, if a magnetic recording medium such as the above-mentioned floppy disk is used, its recording characteristics may be degraded due to repetitive head access for recording/reproduction operations.

In order to effectively prevent such inconvenience, for example, the following function is preferably provided to an electronic still camera system.

Figure 7:
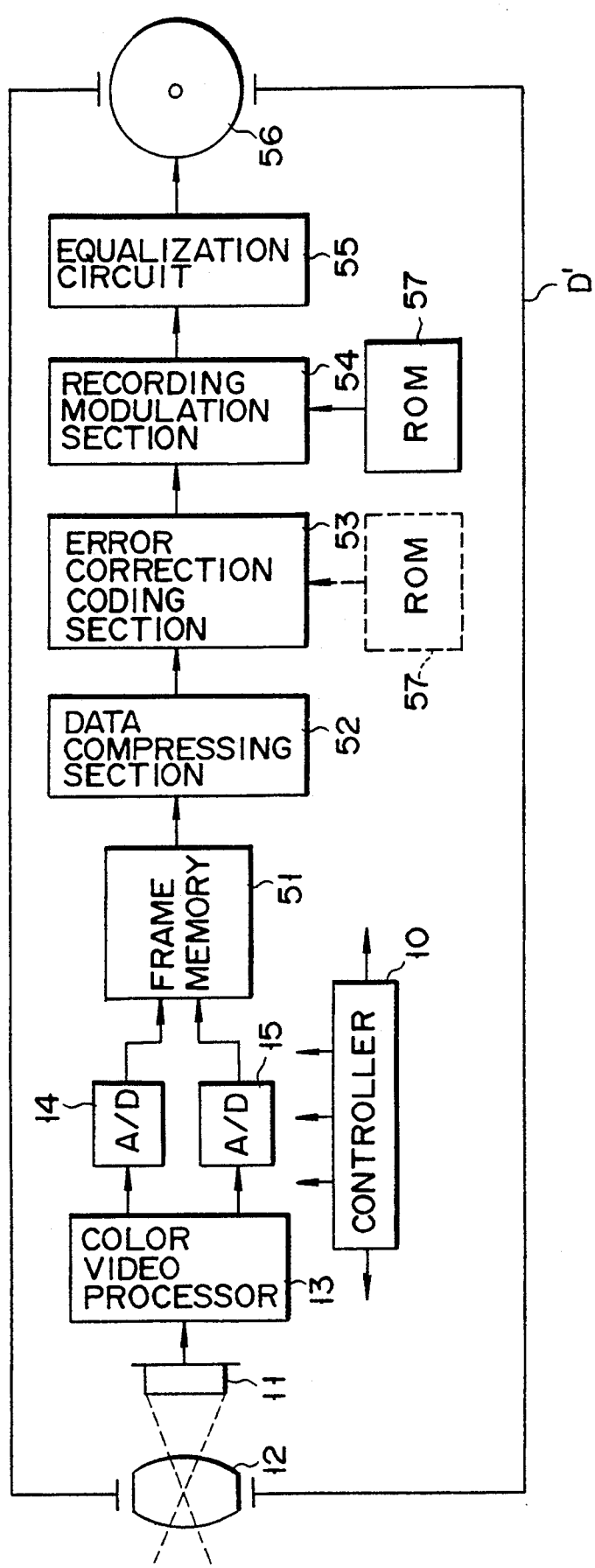
FIG. 7 is a block diagram showing a schematic arrangement of an electronic still camera having a ROM test data contained therein.

As indicated by an arrangement shown in FIG. 7, a ROM 57 in which test data is stored in advance is arranged in an electronic still camera D' having substantially the same arrangement as that shown in FIG. 5. With this arrangement, when a floppy disk (magnetic recording medium 56) is mounted, the test data stored in the ROM 57 is recorded on each empty recording track/sector in the floppy disk through a recording modulation section 54 and an equalization circuit 55 under the control of the controller 10. The test data recorded on this recording track/sector is immediately read out and reproduced to be compared/collated with the test data stored in the ROM 57, thereby determining the recording characteristics of the recording track/senor.

If the test data recorded on the empty recording track/sector and immediately reproduced is different from the test data stored in the ROM 57, it is determined that the recording characteristics of the recording track/sector are degraded. In this case, information representing that the recording track/sector is a defective area is recorded as the above-mentioned recording management information, and a recording operation is performed not to use the recording track/sector for recording.

With such a function, recording of image signals which are processed by data compression coding in the above-described manner can be performed while areas (recording tracks/sectors) which have defective recording characteristics and tend to cause errors in recorded data are excluded from recording areas. Therefore, satisfactorily high quality of recorded image signals can be ensured.

Note that the ROM 57 may be arranged at the position of an error correction coding section 53 as indicated by a dotted line in FIG. 7 in order to record the test data on the floppy disk after error correction coding processing is performed for the test data. In this case, after error correction coding is performed for the test data immediately read out/reproduced from the floppy disk, comparison/collation with the test data stored in the ROM 57 is performed.

With such an arrangement, it can be determined that the recording characteristics of a track/sector in which the test data is recorded are degraded, not only in a case wherein an error is included in error-corrected data but also in a case wherein error correction is performed by error correction coding and correct data is restored. That is, even if the error degree of recorded data falls within the range of the error correction processing capacity of error correction coding, the corresponding recording areas can be excluded from the recording areas of image data. Therefore, quality of recorded image signals can be further improved.

With the above-described function, use of a defective recording medium having inferior recording characteristics can be prevented, and hence sensed images can be recorded with high quality and high reliability.

Instead of detecting defective recording/sectors by using the test data and inhibiting recording of image data on the detected recording tracks/sectors in the above-described manner, after image data processed by data compression coding are temporarily recorded on empty recording tracks/sectors, the recorded image data are immediately read out and reproduced to be compared/collated with image data which are stored in the frame memory 51 upon image sensing. If an error is detected in the recorded/reproduced data by this comparison/collation, an area (recording track/sector) used to record the corresponding image data, of the empty recording tracks/sectors, is changed, and the image data processed by data compression coding is recorded again. Subsequently, use of the recording track/sector previously used to record the image data is inhibited as a defective portion.

Such processing is repeatedly executed until the image data are properly recorded on the floppy disk with high reliability. In this case, the image data are kept stored in the frame memory 51 until recording of the image data is completed.

According to the system of this embodiment which has the above-described function, when image signals are to be processed by data compression coding and recorded on a recording medium suffering from changes in recording characteristics over time, e.g., a magnetic recording medium, quality of the recorded data can be effectively ensured. Especially, when data compression coding is to be performed with high efficiency, since the redundancy of data is greatly reduced, control for inhibiting use of recording tracks/sectors having poor reliability by means of the above-described processing function is very effective in ensuring quality of recorded image signal and improving its reliability.

Figure 3:
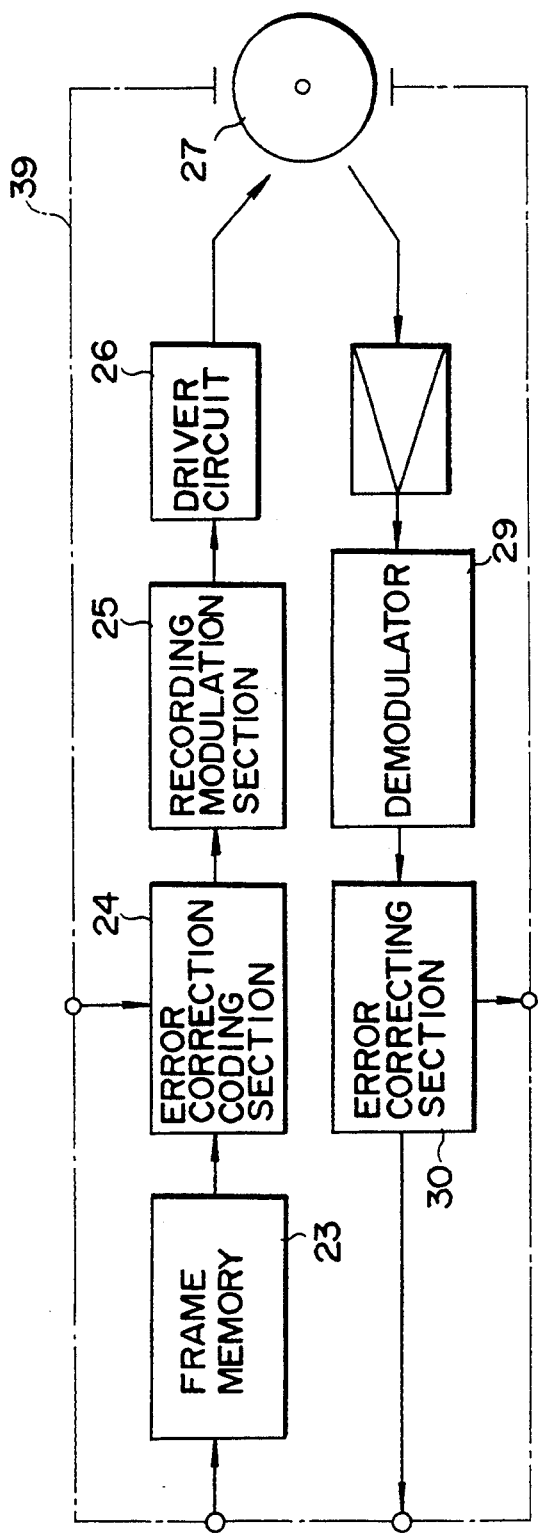
FIG. 3 is a block diagram showing an arrangement of an attachment circuit unit, as the first imaging sub-system, including recording/reproduction functions with respect to a magnetic recording medium.

The present invention is not limited to the above-described embodiments. In the embodiment of FIG. 1, the attachment circuit unit 22 to be mounted on the electronic still camera A and the attachment circuit unit 28 to be mounted on the reproduction apparatus B (FIG. 2) are respectively realized as circuit units exclusively used for recording and reproduction. However, as shown in FIG. 3, these circuit units may be realized as an attachment circuit unit 39 having a recording/reproduction function. With this arrangement, the attachment circuit unit 39 can be commonly used by the electronic still camera A and the reproduction apparatus B. In such a case, a large-capacity hard disk recording medium can be permanently incorporated as the magnetic recording medium 27.

Figure 4:
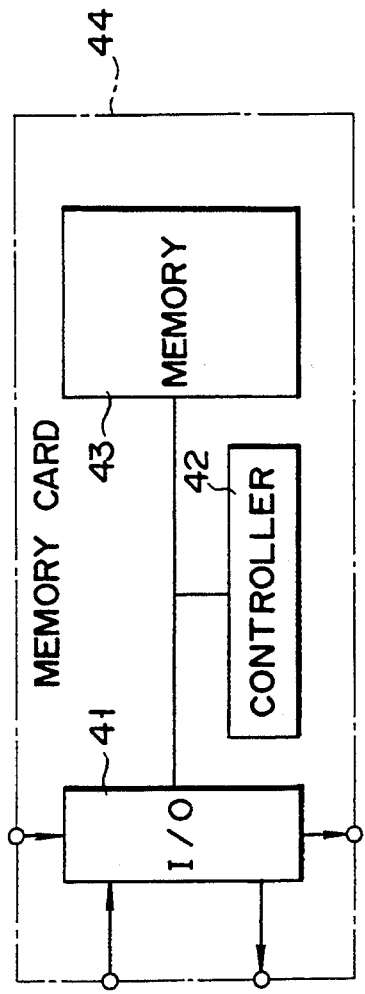
FIG. 4 is a block diagram showing a semiconductor memory card formed into an attachment circuit unit as the second imaging sub-system.

In addition, for example, as shown in FIG. 4, an I/O port 41, a controller 42, and a memory section 43 may be integrated into another attachment circuit 44 as the above-mentioned semiconductor memory card. Various practical effects can be obtained by properly and selectively using these types of attachment circuit units in accordance with photography conditions and purposes of photography. Furthermore, the number of recording tracks and sectors, the recording density, and the like of a floppy disk used as a magnetic recording medium may be determined in accordance with recording specifications. Various changes and modifications can be made within the spirit and scope of the invention.

As has been described above, image signals sensed-/input by the electronic still camera can be digitized and recorded on various types of magnetic recording media which are inexpensive and easy to handle by performing error correction coding processing and recording modulation processing. Therefore, the operability of the camera system or reproduction system can be remarkably improved, and a so-called running cost can be greatly decreased. As a result, for general users, the electronic still camera system or reproduction system becomes very easy to handle.

Since circuit portions for executing signal processing required to record image signals on a magnetic recording medium are formed into an attachment circuit unit, the recording medium can be selectively used in accordance with various photography conductions and purposes, thus obtaining many effects, e.g., improving its versatility.

In addition, since image data processed by data compression coding can be recorded by arbitrarily using recording tracks/sectors, a large amount of image data can be recorded by efficiently using the recording capacity of a magnetic recording medium. Moreover, since image data are recorded while excluding recording tracks/sectors having degraded recording characteristics, various practical effects can be obtained, e.g., the image signals can be recorded with high quality and reliability.

Figure 8:
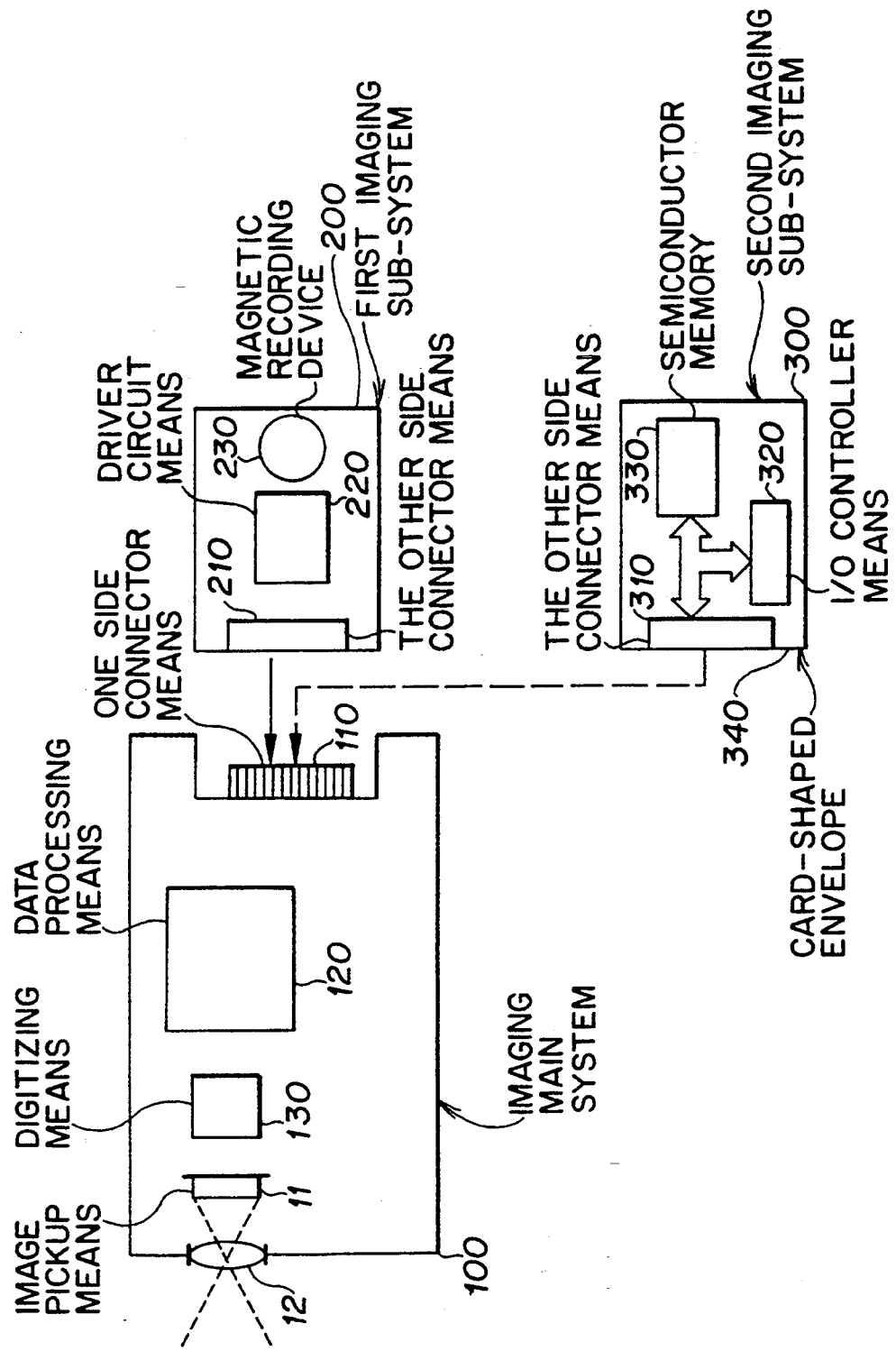
FIG. 8 is a block diagram showing a schematic arrangement of an electronic imaging system of the present invention.

FIG. 8 is a block diagram showing a schematic arrangement of an electronic imaging system of the present invention. An imaging main system 100 may be embodied as an electronic camera resembling the electronic still camera mentioned above with reference to FIG. 1, or it may be embodied as a reproduction apparatus resembling the apparatus mentioned above with reference to FIG. 2. The system 100 having a data processing means 120 and a one-side connector 110. The data processing means 120 is provided for generating a data signal to be recorded in a recording device or media, the data signal including an image data signal in digital form corresponding to a previously picked up image, or the data processing means 120 is provided for generating a signal of a form adapted to produce an image via a television monitor, for example, based on a reproduced signal from the recording device or media. The one-side connector 110 is provided for connecting any one of several predetermined imaging sub-systems applicable to this electronic imaging system with this imaging main system 100.

Each one of several first imaging sub-systems 200 (only one is shown) is formed as a unit and has a driver circuit 220, the other-side connector 210 to be engaged with the one-side connector 110, and hard disk 230 of a small size as the magnetic recording device, then the first imaging sub-system 200. The driver circuit 220 is provided for driving a magnetic recording device or media so as to record or reproduce the data signal supplied thereto or sent therefrom, while the first imaging sub-system 200 is connected to the imaging main system 100 by means of a connection between the one-side connector 110 of the imaging main system 100 and the other-side connector 210 of this first imaging sub-system 200.

Each one of several second imaging sub-systems 300 is formed as a unit and has an I/O controller 320, the other-side connector 310, a semiconductor memory 330, and a card-shaped envelope for covering the I/O controller means 320 and the semiconductor memory 330. The I/O controller 320 is provided for controlling record and/or reproduction operations for the semiconductor memory 330 with a data signal supplied thereto or sent therefrom, while the second imaging sub-system 300 is connected to the imaging main system 100 by means of a connection between the one-side connector 110 of the imaging main system 100 and the other side connector 310 of this second imaging sub-system 300. The other-side connector 310 of this second imaging sub-system 300 is the same as the other-side connector 210 of the first imaging sub-system 200. The I/O controller 320 is provided for controlling transmission of the data signal conveyed through the other-side connector 310 of the second imaging sub-system 300 in such a manner so as to be compatible with the data signal conveyed through the other-side connector 210 of the first imaging sub-system. The type of transmission signal is adaptive to a predetermined regulation concerning an order of respective pins and assigned functions thereto, such functions as "GND", "DATA", "ADDRESS", "Vcc", "BUSY", "READY", or "WAIT".

The imaging main system 100 further comprises an image pickup means 11 for generating an image signal of an analog form depending on the photoelectric conversion of the image pickup means 11. A/D circuit 130 converts the analog image signal outputted by the image pickup means 11 to a digital form adapted to the storage device or the media applied.

In the electronic imaging system of FIG. 8, a perfect compatibility for the first and second imaging sub-systems 200 and 300 as to transmission of data through the connector means 110, 210 and 310 can be ensured by the controlling operation of the I/O controller means 320 disposed in the second imaging sub-system 300. The I/O controller means 320 may be constituted by a microprocessor.

With the electronic imaging system of the present invention constituted and organized as mentioned above, full expediency can be ensured for using the electronic imaging system in accordance with photography conditions, purposes of photography, or amount of data intended for recording/reproducing.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An electronic imaging system for recording or reproducing a picture utilizing an applied recording device or media comprising:

an imaging main system having a data processing means and one-side connector means, said data processing means generating a data signal to be recorded in said recording device or media inclusive of a digital image data signal corresponding to a previously picked-up image, or generating a signal of a form adapted to display an image on a display means based on a reproduced signal from said recording device or media, said one-side connector means connects any one of several predetermined imaging sub-systems applicable to the electronic imaging system with said imaging main system;

a plurality of first imaging sub-systems each one being formed as a unit and having a driver circuit means and an other-side connector means, said driver circuit means driving a magnetic recording device or media so as to record or reproduce said data signal supplied thereto or sent therefrom, while such first imaging sub-system is connected to said imaging main system by means of a connection between said one-side connector means of said imaging main system and said other-side connector means of such imaging sub-system;

a plurality of second imaging sub-systems each one being formed as a unit and having an I/O controller means and an other-side connector means, said I/O controller means controlling record and/or reproduction operations for an applied semiconductor memory as to said data signal supplied thereto or sent therefrom, while such second imaging sub-system is connected to said imaging main system by means of a connection between said one-side connector means of said imaging main system and said other-side connector means of such second imaging sub-system, said I/O controller means controlling transmission of said data signal conveyed through said other-side connector means of such second imaging sub-system to be compatible with said data signal conveyed through said other-side connector means of such first imaging sub-system.

2. An electronic imaging system according to claim 1, wherein said imaging main system further comprises:

an image pickup means for generating an analog image signal depending on the photoelectric conversion of the image pickup means; and digitizing means for converting said analog image signal outputted by said image pickup means to a digital form adapted to said storage device or media applied.

3. An electronic imaging system according to claim 1, wherein each one of said plurality of first imaging sub-systems further comprises:

a hard disk of a small size as said magnetic recording device.

4. An electronic imaging system according to claim 1, wherein each one of said plurality of second imaging sub-systems further comprises:

a card-shaped envelope containing said I/O controller means and said semiconductor memory.

5. An electronic imaging system according to claim 1, wherein the other-side connector means of the second imaging sub-systems has the same shape as the other-side connector means of the first imaging sub-systems.

* * * * *